(12) United States Patent
Pulugurta et al.

(10) Patent No.: US 8,737,987 B1
(45) Date of Patent: May 27, 2014

(54) ENHANCED WIRELESS DEVICE NETWORK RESCAN RATE DETERMINATION

(75) Inventors: Srikanth Eeswara Chandra Pulugurta, Overland Park, KS (US); Siddharth S. Oroskar, Overland Park, KS (US); Anoop Kumar Goyal, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 674 days.

(21) Appl. No.: 13/032,800

(22) Filed: Feb. 23, 2011

(51) Int. Cl.
*H04W 48/18* (2009.01)

(52) U.S. Cl.
USPC ............... 455/432.1; 455/403; 455/432.2

(58) Field of Classification Search
USPC .......................................... 455/432.1
See application file for complete search history.

(56) References Cited

U.S. PATENT DOCUMENTS

| | | | |
|---|---|---|---|
| 5,119,502 A | 6/1992 | Kallin et al. | |
| 5,666,355 A | 9/1997 | Huah et al. | |
| 5,842,122 A | 11/1998 | Schellinger et al. | |
| 5,995,829 A | 11/1999 | Broderick | |
| 6,282,419 B1 | 8/2001 | Findikli | |
| 6,400,948 B1 | 6/2002 | Hardin | |
| 6,775,531 B1 | 8/2004 | Kaewell et al. | |
| 7,174,188 B2 | 2/2007 | Kiyomoto et al. | |
| 7,197,312 B2 | 3/2007 | Gunaratnam et al. | |
| 7,263,358 B2 | 8/2007 | Chiou | |
| 7,330,727 B2 | 2/2008 | Korneluk et al. | |
| 7,480,519 B2 | 1/2009 | Jeong et al. | |
| 7,593,727 B2 | 9/2009 | Zhao et al. | |
| 2004/0224696 A1 | 11/2004 | Korneluk et al. | |
| 2006/0003768 A1 | 1/2006 | Chiou | |
| 2006/0229057 A1* | 10/2006 | Farrugia et al. | 455/403 |
| 2006/0258386 A1 | 11/2006 | Jeong et al. | |
| 2007/0047476 A1 | 3/2007 | Zhao et al. | |
| 2007/0218926 A1 | 9/2007 | Zhuang et al. | |
| 2007/0293244 A1 | 12/2007 | Lee et al. | |
| 2008/0293405 A1* | 11/2008 | Meyer | 455/432.1 |
| 2009/0274118 A1 | 11/2009 | De Sanctis et al. | |
| 2010/0067492 A1 | 3/2010 | Kamei | |
| 2010/0240368 A1* | 9/2010 | Fox et al. | 455/435.3 |

* cited by examiner

*Primary Examiner* — Lester Kincaid
*Assistant Examiner* — Diego Herrera

(57) ABSTRACT

What is disclosed is a method of operating a communication system. The method includes receiving roaming call records for wireless communication devices from a roaming wireless communication network. The method also includes processing the roaming call records and home call records of a home wireless communication network for at least a first wireless communication device to determine a network handover count, and processing the network handover count to determine a network rescan rate for the first wireless communication device. The method also includes transferring the network rescan rate for delivery to the first wireless communication device.

18 Claims, 5 Drawing Sheets

US 8,737,987 B1

ENHANCED WIRELESS DEVICE NETWORK RESCAN RATE DETERMINATION

TECHNICAL FIELD

Aspects of the disclosure are related to the field of communications, and in particular, determining wireless device network rescan rates in wireless communication networks.

TECHNICAL BACKGROUND

Wireless communication systems typically include wireless access nodes, such as base stations, which provide wireless access to communication services for user devices over wireless links. A typical wireless communication system includes many wireless access nodes to provide wireless access across a geographic region, with individual wireless coverage areas associated with each wireless access node. The wireless access nodes exchange user communications and overhead communications between wireless user devices and a core network of the wireless communication system.

Many different wireless carriers, such as cellular service companies, can operate wireless communication networks, and allow wireless communication devices from one carrier to operate on another carrier. This process is typically referred to as roaming, and a wireless communication device intended for use on a first carrier network can roam to a second carrier network and still receive access to communication services through the second carrier network. Wireless communication devices typically perform a network scan process to determine availability of wireless access from different wireless communication networks, as provided by the different wireless carriers.

OVERVIEW

What is disclosed is a method of operating a communication system. The method includes receiving roaming call records for wireless communication devices from a roaming wireless communication network. The method also includes processing the roaming call records and home call records of a home wireless communication network for at least a first wireless communication device to determine a network handover count, and processing the network handover count to determine a network rescan rate for the first wireless communication device. The method also includes transferring the network rescan rate for delivery to the first wireless communication device.

What is also disclosed is a communication system. The communication system includes a network interface configured to receive roaming call records for wireless communication devices from a roaming wireless communication network. The communication system also includes a processing system configured to process the roaming call records and home call records of a home wireless communication network for at least a first wireless communication device to determine a network handover count. The processing system is also configured to process the network handover count to determine a network rescan rate for the first wireless communication device. The communication system also includes a wireless interface configured to transfer the network rescan rate for delivery to the first wireless communication device.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
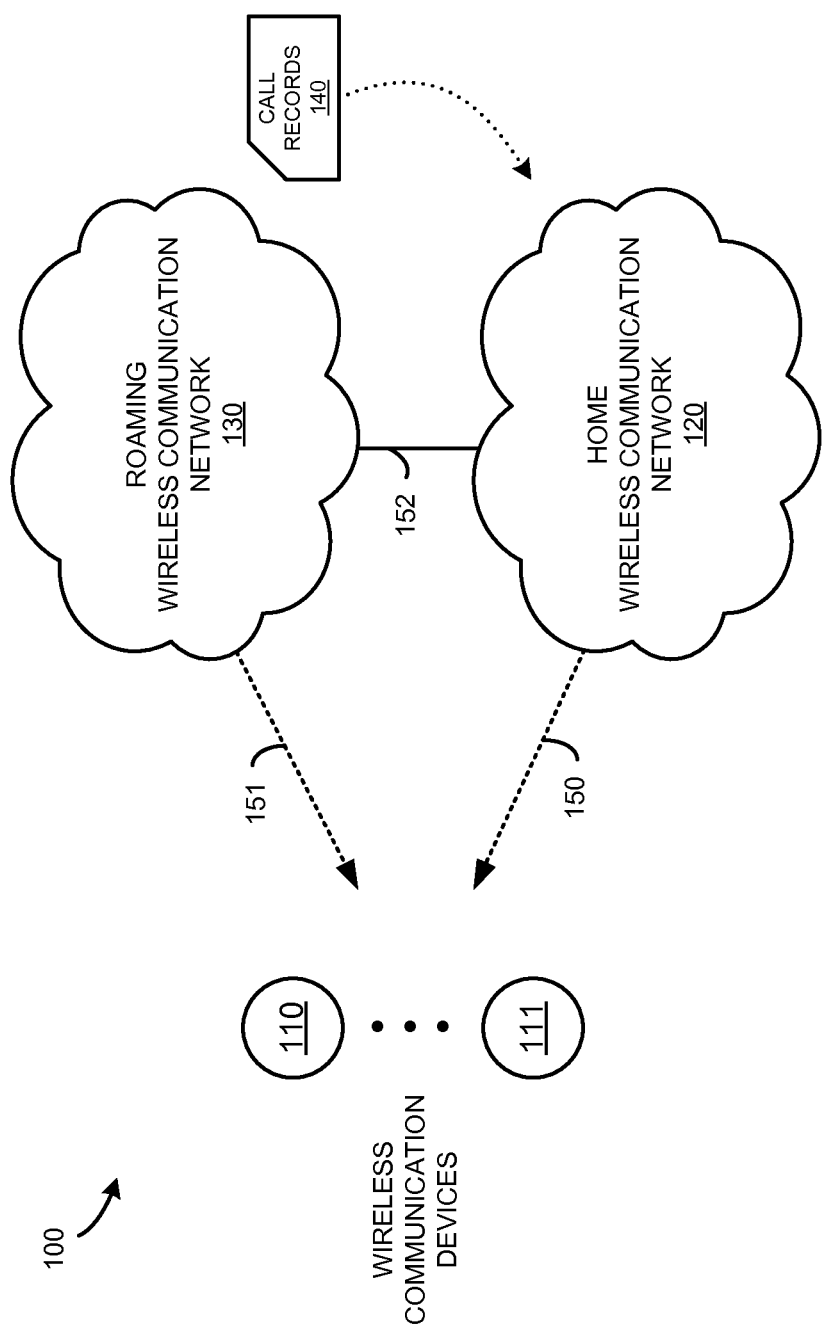
FIG. 1 is a system diagram illustrating a communication system.

FIG. 1 is a block diagram illustrating communication system 100. Communication system 100 includes wireless communication devices 110-111, home wireless communication network 120, and roaming wireless communication network 130. Wireless communication devices 110-111 each can receive wireless access to communication services over wireless links, such as wireless links 150-151. In FIG. 1, wireless link 150 represents wireless access to communication services from home wireless communication network 120, while wireless link 151 represents wireless access to communication services from roaming wireless communication network 130. Each of wireless communication devices 110-111 can receive home wireless access over wireless link 150, and can receive roaming wireless access over wireless link 150. Although only one wireless link per wireless communication network is shown in FIG. 1, it should be understood that a different representation of wireless links could be shown in FIG. 1.

Home wireless communication network 120 includes the wireless access equipment of a home wireless communication service provider in this example, such as a wireless carrier from which each of wireless communication devices 110-111 initially purchased wireless service. Roaming wireless communication network 130 includes the wireless access equipment of a non-home wireless communication service provider in this example, such as a wireless carrier which provides roaming services to wireless communication devices which initially purchased wireless service from another wireless carrier.

Figure 2:
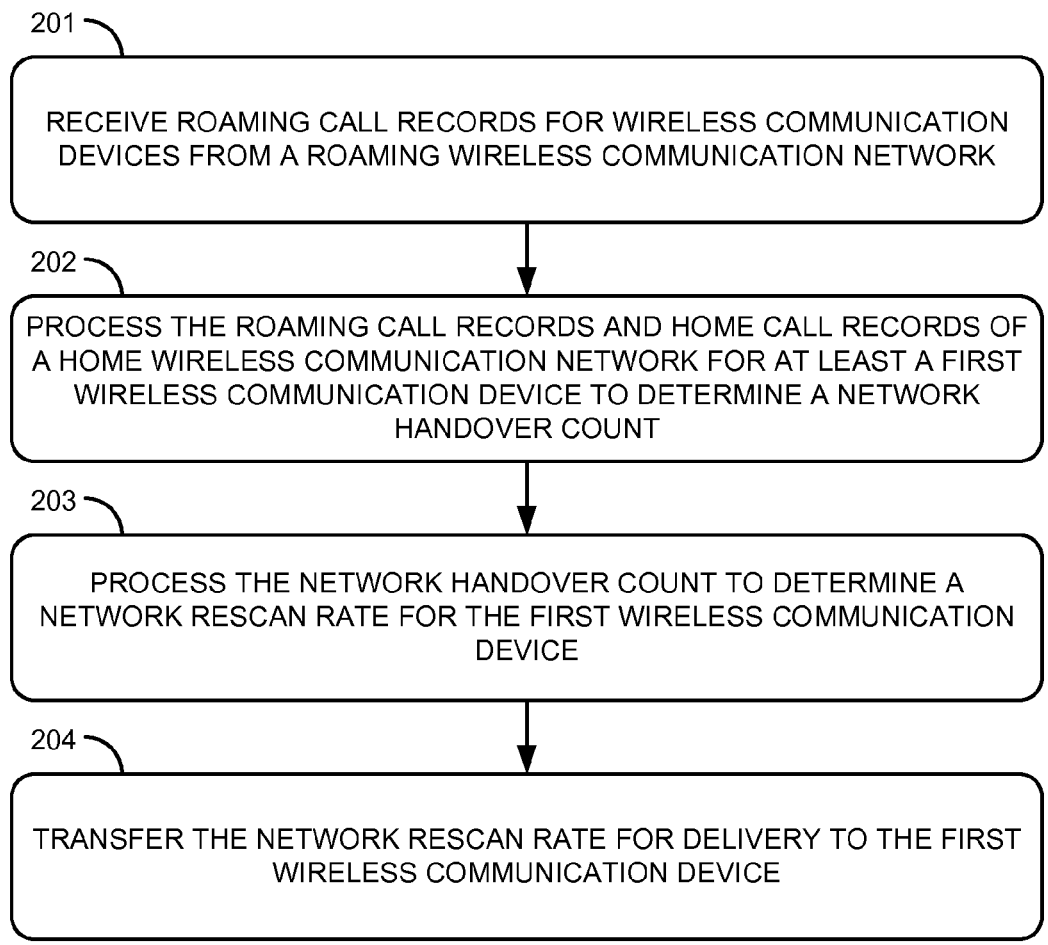
FIG. 2 is a flow diagram illustrating a method of operation of a communication system.

FIG. 2 is a flow diagram illustrating a method of operating communication system 100. The operations of FIG. 2 are referenced herein parenthetically. In FIG. 2, home communication network 120 receives (201) roaming call records 140 from roaming wireless communication network 130. In this example, roaming call records 140 are transferred over link 152. Roaming call records 140 include information associated with communication services provided to wireless communication devices 110-111 during roaming wireless access through roaming wireless communication network 130. The information included with roaming call records 140 could include voice call start/stop times, call durations, text messaging transfer times, called or caller phone numbers, device identifiers, or other communication service record information associated with either of wireless communication devices 110-111. Roaming call records 140 could be transferred by roaming wireless communication network 130 on a periodic basis, or upon request by home wireless communication network 120, among other transfer times.

Home communication network 120 processes (202) roaming call records 140 and home call records of home communication network 120 for at least a first wireless communication device to determine a network handover count. The network handover count could comprise a quantity of individual roaming call records which correspond to individual home call records for at least the first wireless communication device. The network handover count could also include a quantity of instances of a wireless communication device changing from receiving wireless access from a first wireless communication network to receiving wireless access from a second wireless communication network, within a predetermined time.

The change in wireless access could be determined by correlating communications sessions for a particular wireless communication device which occur on both roaming wireless communication network 130 and home wireless communication network 120 within a predetermined amount of time. One example of a single handover is a voice call placed by a first wireless communication device through roaming wireless communication network 130 correlated to a voice call for the same wireless communication device on home wireless communication network 120 within a predetermined time, perhaps due to a separate voice call or an in-call wireless handoff from equipment of the first network to the second network. The predetermined time corresponds to a limited timeframe over which the change in wireless networks occurs. In this example, a handover includes where either of wireless communication devices 110-111 change from receiving wireless access from home wireless communication network 120 to receiving wireless access from roaming wireless communication network 130, or change from receiving wireless access from roaming wireless communication network 130 to receiving wireless access from home wireless communication network 120, within a predetermined time.

Roaming call records 140 received from roaming wireless communication network 130 include a time associated with communication session instances, such as a time associated with a voice call, data session, text message, or other network usage events, such as a registration request. The home call records also indicate times associated with communication session instances or network usage events. Identifiers for the wireless communication devices listed in the call records, such as a mobile device number (MDN), mobile station identifier (MSID), mobile equipment identifier (MEID), mobile identification number (MIN), electronic serial number (ESN), device type, model number, serial number, SIM card identifier, phone number, account number, or other identifier, could be used to correlate the call record information to a particular wireless communication device between roaming call records 140 and the home call records. A count or quantity of the number of handovers within the predetermined time is then determined based on the call records for the roaming and home networks.

Home communication network 120 processes (203) the network handover count to determine a network rescan rate for the first wireless communication device. In this example, the network rescan rate is determined as proportional to the network handover count, although other configurations could be employed. The network rescan rate comprises a counter, timer, periodic cycle, or other time-based indicator used by a wireless communication device to periodically search for wireless communication network availability. A lower or slower rescan rate would correspond to a longer rescan period, while a higher or faster rescan rate would correspond to a shorter rescan period. In typical examples, a wireless communication device initially registers for wireless access from a first wireless communication network, or element of a first wireless communication network, such as a base station. The network rescan rate can indicate when a wireless communication device should rescan for wireless communication network availability, relative signal strength among wireless access nodes, or other parameters of nearby wireless access systems, such as base stations. The network rescan process can occur during periods of inactivity, such as when a wireless communication device is idle. In other examples, the network rescan rate indicates when a wireless communication device should rescan for wireless communication network availability during a present communication session, or upon termination of a present communication session, such as a voice call. The network rescan process could include searching for beacon or pilot signals transferred by various wireless communication networks within wireless range of the scanning wireless communication device, and signal strengths of the various signals could be determined. The network rescan process could also include tuning away from a present frequency spectrum or communication channel to search for other wireless communication networks on different frequency spectrums or communication channels, possibly using different wireless communication protocols or modes.

Home communication network 120 transfers (204) the network rescan rate for delivery to the first wireless communication device. Once the network rescan rate has been determined, home communication network 120 wirelessly transfers the network rescan rate to the appropriate wireless communication device. The network rescan rate could be determined for wireless communication device 110, wireless communication device 111, or both. The network rescan rate could be transferred in user or overhead portions of wireless communications over a wireless link when the associated wireless communication device is presently receiving wireless access from home wireless communication network 120, or could be included in a registration process for a wireless communication device after a previous rescan process had initiated a change in networks to home wireless communication network 120, among other configurations.

Figure 3:
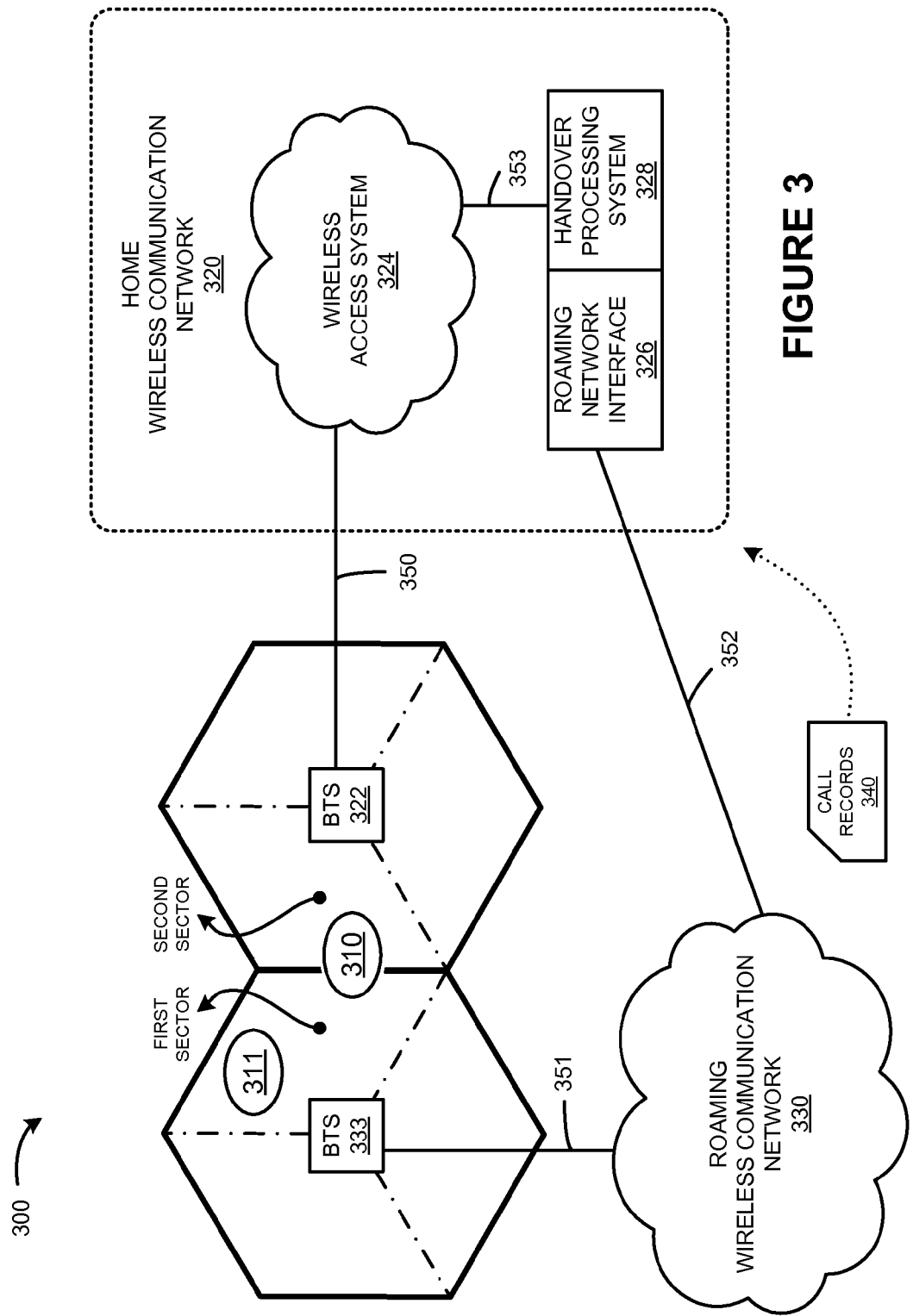
FIG. 3 is a system diagram illustrating a communication system.

FIG. 3 is a system diagram illustrating communication system 300. Communication system 300 includes wireless communication devices 310-311, home base transceiver station (BTS) 322, home wireless communication network 320, roaming wireless communication network 330, and roaming base transceiver station (BTS) 333. BTS 322 and home wireless communication network 320 communicate over backhaul link 350, which is a T1 link in this example. BTS 333 and roaming wireless communication network 330 communicate over link 351, which is a T1 link in this example. Each of wireless communication devices 310-311 can communicate with either of BTS 322 or BTS 333 over Code Division Multiple Access (CDMA) wireless links. The wireless links for wireless communication devices 310-311 are not shown in FIG. 3 for clarity. Home wireless communication network 320 and roaming wireless communication network 330 communicate over link 352, which is a packet link capable of carrying Internet protocol (IP) packets over the Internet in this example.

Wireless communication devices 310-311 each comprise user devices, such as a mobile wireless phone capable of data communications over wireless links using the CDMA wireless protocol in this example. It should be understood that other wireless protocols could be employed.

Home wireless communication network 320 includes a wireless network of a wireless communication provider, such as a cellular phone and data service provider, among other examples. In this example, home wireless communication network 320 is operated by a home wireless service provider of wireless communication devices 310-311. A home wireless service provider includes a wireless carrier, such as a cellular communications company, through which wireless communication devices 310-311 each are homed at by initially purchasing wireless service through. Home wireless communication network 320 could also provide roaming services to other wireless communication devices, such as devices initially purchased through the wireless carrier associated with roaming wireless communication network 330.

In this example, home wireless communication network 320 includes wireless access system 324, roaming network interface 326, and handover processing system 328. Wireless access system 324 and handover processing system 328 communicate over Ethernet link 353. Wireless access system 324 includes equipment and systems to provide wireless access to communication services for wireless communication devices over a geographic area. Wireless access system 324 could comprise base stations, further base transceiver stations (BTS), radio node controllers (RNC), base station controllers (BSC), mobile switching centers (MSC), authentication, authorization and accounting (AAA) equipment, wireless access nodes, wireless access node controllers, routers, transceivers, or antennas, among other equipment and systems. In some examples, wireless access system 324 includes BTS 322.

Roaming network interface 326 includes equipment and systems to exchange communications with roaming communication network 330 using the Internet protocol (IP) over link 352. In this example, roaming call records 340 are received by roaming network interface 326 over link 352. Roaming network interface 326 could comprise network interface cards (NIC), transceivers, processing systems, routers, switches, gateways, or bridges, among other network interface and communication equipment.

Handover processing system 328 includes computer processing equipment for processing call record information of roaming and home wireless communication networks. Handover processing system 328 includes equipment such as computer processing systems, communication interfaces, computer-readable storage media, and other equipment to store and exchange call records information for wireless communication devices. Handover processing system 328 may comprise operating systems, logs, utilities, drivers, networking software, firmware, and other software typically loaded onto a computer system.

BTS 322 includes RF communication and control circuitry, transceiver, and antennas, as well as wireless communications equipment capable of communicating with and providing wireless access to communication services for user devices, such as wireless communication devices 310-311, using the CDMA communication mode. BTS 322 is associated with home wireless communication network 320 in this example, and provides wireless access to the communication services of home wireless communication network 320. The communication services could include voice calls, messaging, data access, or other communication services. In FIG. 3, BTS 322 provides wireless access over a physical region of coverage, illustrated by the hexagonal coverage area associated with BTS 322. The hexagonal coverage area associated with BTS 322 is further divided into sectors, with three sectors shown in FIG. 3. Other configurations of coverage areas and sectors could be employed.

Roaming wireless communication network 330 includes a wireless network of a wireless communication provider, such as a cellular phone and data service provider, among other examples. In this example, roaming wireless communication network 330 is operated by a roaming wireless service provider of wireless communication devices 310-311. A roaming wireless service provider includes a wireless carrier, such as a cellular communications company, through which wireless communication devices 310-311 each are not homed at, and did not initially purchased wireless service through. Roaming wireless communication network 320 could also provide home services to other wireless communication devices, such as devices initially purchased through the wireless carrier associated with roaming wireless communication network 330.

BTS 333 includes RF communication and control circuitry, transceiver, and antennas, as well as wireless communications equipment capable of communicating with and providing wireless access to communication services for user devices, such as wireless communication devices 310-311, using the CDMA communication mode. BTS 333 is associated with roaming wireless communication network 330 in this example, and provides wireless access to the communication services of roaming wireless communication network 330. The communication services could include voice calls, messaging, data access, or other communication services. In FIG. 3, BTS 333 provides wireless access over a physical region of coverage, illustrated by the hexagonal coverage area associated with BTS 333. The hexagonal coverage area associated with BTS 333 is further divided into sectors, with three sectors shown in FIG. 3. As with BTS 322, other configurations of coverage areas and sectors could be employed.

Figure 4:
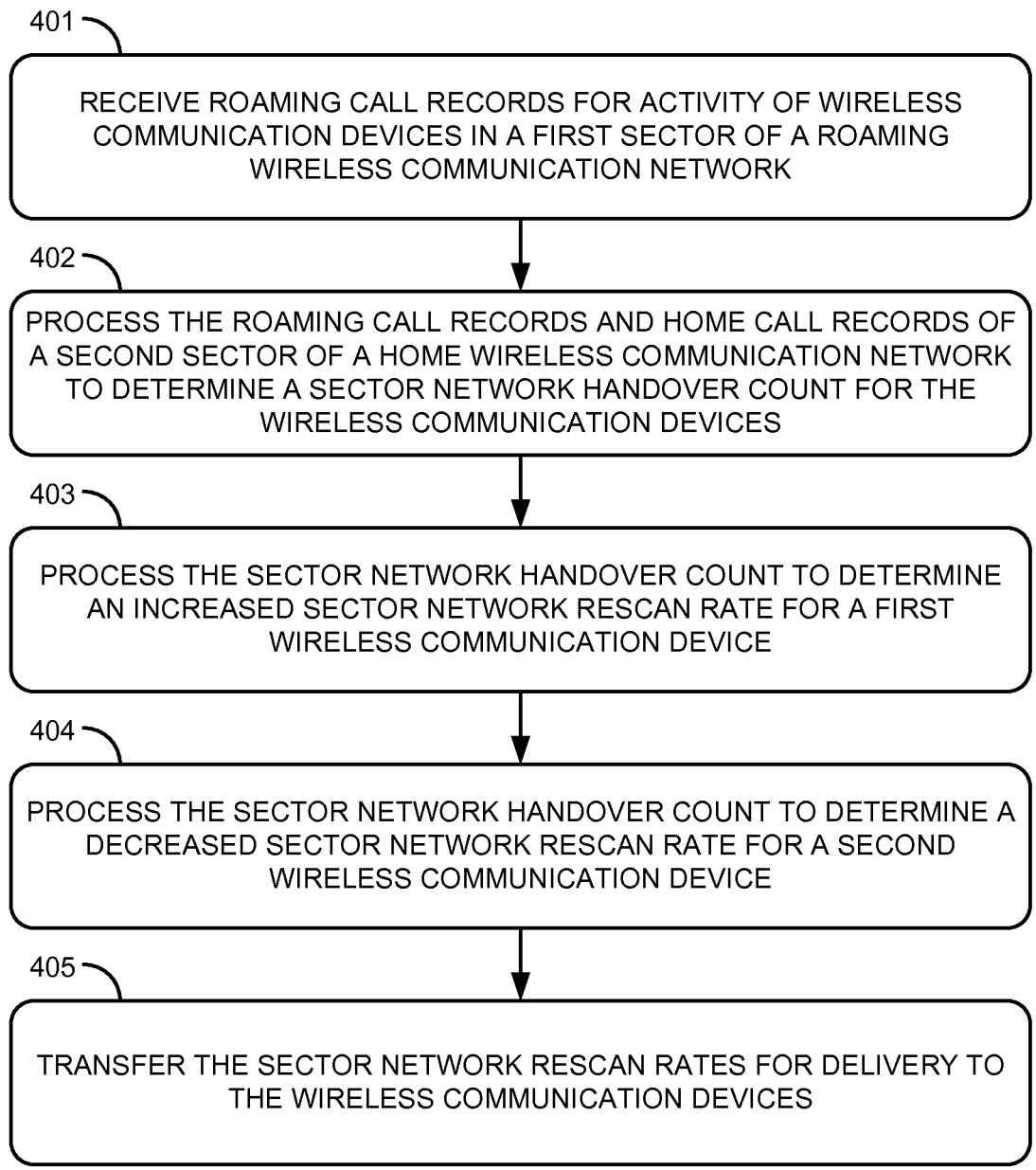
FIG. 4 is a flow diagram illustrating a method of operation of a communication system.

FIG. 4 is a flow diagram illustrating a method of operating communication system 300. The operations of FIG. 4 are referenced herein parenthetically. In FIG. 4, roaming network interface 326 receives (401) roaming call records 340 for activity of wireless communication devices 310-311 in a first sector of roaming wireless communication network 330. In this example, the first sector is shown in FIG. 3 as associated with BTS 333, which is associated with roaming wireless communication network 330. Also, in FIG. 3, wireless communication device 311 is shown presently located within a first sector associated with BTS 333 of roaming wireless communication network 330, while wireless communication device 310 is shown presently located in a border area between the first sector and a second sector associated with BTS 322 of home wireless communication network 320. Although the coverage areas of BTS 333 and BTS 322 are aligned as shown in FIG. 3, it should be understood that the coverage areas could overlap or have other configurations.

Roaming call records 340 include event information associated with communication services provided to wireless communication devices 310-311 by roaming wireless communication network 330. The event information included with roaming call records 340 could include voice call start/stop times, call durations, text messaging transfer times, called or caller phone numbers, device identifiers, or other communication service record information associated with either of wireless communication devices 310-311. Roaming call records 340 could include a tabular data format of communication events correlated to wireless communication devices, such as a table or database listing call start/stop times associated with particular wireless communication devices. Roaming call records 340 could be transferred by roaming wireless communication network 330 on a periodic basis, or upon request by home wireless communication network 320, among other transfer times. In this example, roaming call records are transferred over link 352 by roaming communication network 330 for delivery to roaming network interface 326 of home wireless communication network 320. Roaming network interface 326 is communicatively coupled to handover processing system 328, and roaming network interface 326 transfers roaming call records 340 for delivery to handover processing system 328.

Handover processing system 328 processes (402) roaming call records 340 and home call records of the second sector of home wireless communication network 320 to determine a sector network handover count for wireless communication devices 310-311. In this example, the second sector is shown in FIG. 3 as associated with BTS 322, which is associated with home wireless communication network 324. Equipment or systems of home wireless communication network 320, such as systems in wireless access system 324, determine the home call records for communication activities of wireless communication devices receiving wireless access from home wireless communication network 320. These systems could include billing systems, accounting systems, AAA systems, or other systems, and could transfer the home call records in a tabular or database data format similar to roaming call records 340. The home call records could be transferred for delivery to handover processing system 328 over link 353 from equipment or systems in home wireless communication network 320, such as wireless access system 324.

The sector network handover count for wireless communication devices 310-311 includes a count of instances where a communication session for wireless communication devices 310-311 on roaming wireless communication network 330 is correlated in time with a communication session for the same wireless communication device on home wireless communication network 320. One example of a sector network handover is a voice call placed by wireless communication device 310 through the first sector of roaming wireless communication network 330, which ends within a predetermined time of a second voice call by wireless communication device 310 through the second sector of home wireless communication network 320. In another example, the same communication session is maintained for wireless communication device 310, but a change in networks or sectors occurs, possibly due to a handoff from BTS 333 to BTS 322. It should be understood a change in networks could occur in a different order than discussed above. Additionally, the sector network handover count is correlated in time to a predetermined time window. For example, the predetermined time window could be one minute, and the sector network handover count could then include all sector network handovers for each of wireless communication devices 110-111 that occur within the one minute period. Other time periods could be used. In this example, the sector network handover count for wireless communication device 311 is determined to be lower than the sector network handover count for wireless communication device 310. However, the sector network handover count typically changes over time, as the positions of wireless communication devices 310-311 change, signal strength conditions fluctuate, or other factors influence the network selected by each of wireless communication devices 310-311 after a rescan process. In further examples, roaming call records 340 and the home call records are processed to determine the network handover count by determining a quantity of individual roaming call records occurring within a predetermined time of individual home call records for at least one wireless communication device. This process could be repeated for additional wireless communication devices, or the records could be processed for all active wireless communication devices as a collective group.

Handover processing system 328 processes (403) the sector network handover count to determine an increased sector network rescan rate for wireless communication device 310. Handover processing system 328 also processes (404) the sector network handover count to determine a decreased sector network rescan rate for wireless communication device 311. As discussed above, the sector network handover count is determined for each of wireless communication devices 310-311, where wireless communication device 310 has a higher sector network handover count than wireless communication device 311 in this example. A sector network handover count threshold could be applied to the sector network handover counts of each of wireless communication devices 310-311. If the sector network handover count rises above a threshold for a certain wireless communication device, then a different network rescan rate could be determined. Likewise, if the sector network handover count falls below a threshold for a certain wireless communication device, then a different network rescan rate could be determined. Assuming in this example that the sector network handover count for wireless communication device 310 exceeds a first threshold, then the sector network rescan rate is determined to be at a faster rate. The new sector network rescan rate for wireless communication device 310 could be determined to be an increase of a default or initial rescan rate, or an increase in a previously determined rescan rate. Also, assuming in this example that the sector network handover count for wireless communication device 311 falls below a second threshold, then the sector network rescan rate is determined to be at a slower rate. The new sector network rescan rate for wireless communication device 311 could be determined to be a decrease of a default or initial rescan rate, or a decrease in a previously determined rescan rate.

Handover processing system 328 transfers (405) the sector network rescan rates for delivery to each of wireless communication devices 310-311. In this example, the sector network rescan rates are transferred through wireless access system 324 for delivery to each of wireless communication devices 310-311. The sector network rescan rates could be included in overhead portions of the wireless communications exchanged between each of wireless communication devices 310-311 and wireless access system 324, or could be transferred in user portions of the wireless communications. In further examples, such as where a wireless communication device presently is receiving wireless access through roaming wireless communication network 330, the sector network rescan rate could be transferred by home wireless communication network 320 through roaming wireless communication network 330 for delivery to the associated wireless communication device. In other examples where a wireless communication device presently is receiving wireless access through roaming wireless communication network 330, home wireless communication network 320 waits for the particular wireless communication device to rescan and register for wireless access with home wireless communication network 320 before transferring the sector network rescan rate to the particular wireless communication device. Although in this example, different sector network rescan rates are determined for each wireless communication device, in other examples, a sector network rescan rate is determined for all wireless communication devices communicating through a particular sector of wireless coverage, through a particular base station, or for other groupings.

In further examples, home wireless communication network 320 receives a battery level status of wireless communication devices 310-311. The battery level status could correspond to the amount of energy, charge, or power remaining in a battery contained within each of wireless communication devices 310-311, such as when wireless communication devices 310-311 each comprise handheld portable wireless devices. Handover processing system 328 could receive the battery level status information, and further process the network handover count and the battery level status to determine the network rescan rate. In some examples, when the battery level status indicates a low battery for a particular wireless communication device, the network rescan rate could be decreased to reduce the level of power required by the wireless communication device by reducing the quantity of rescans performed. Additionally, the network rescan rate could be increased only on wireless communication devices which have a battery level status which exceeds a battery level threshold.

Figure 5:
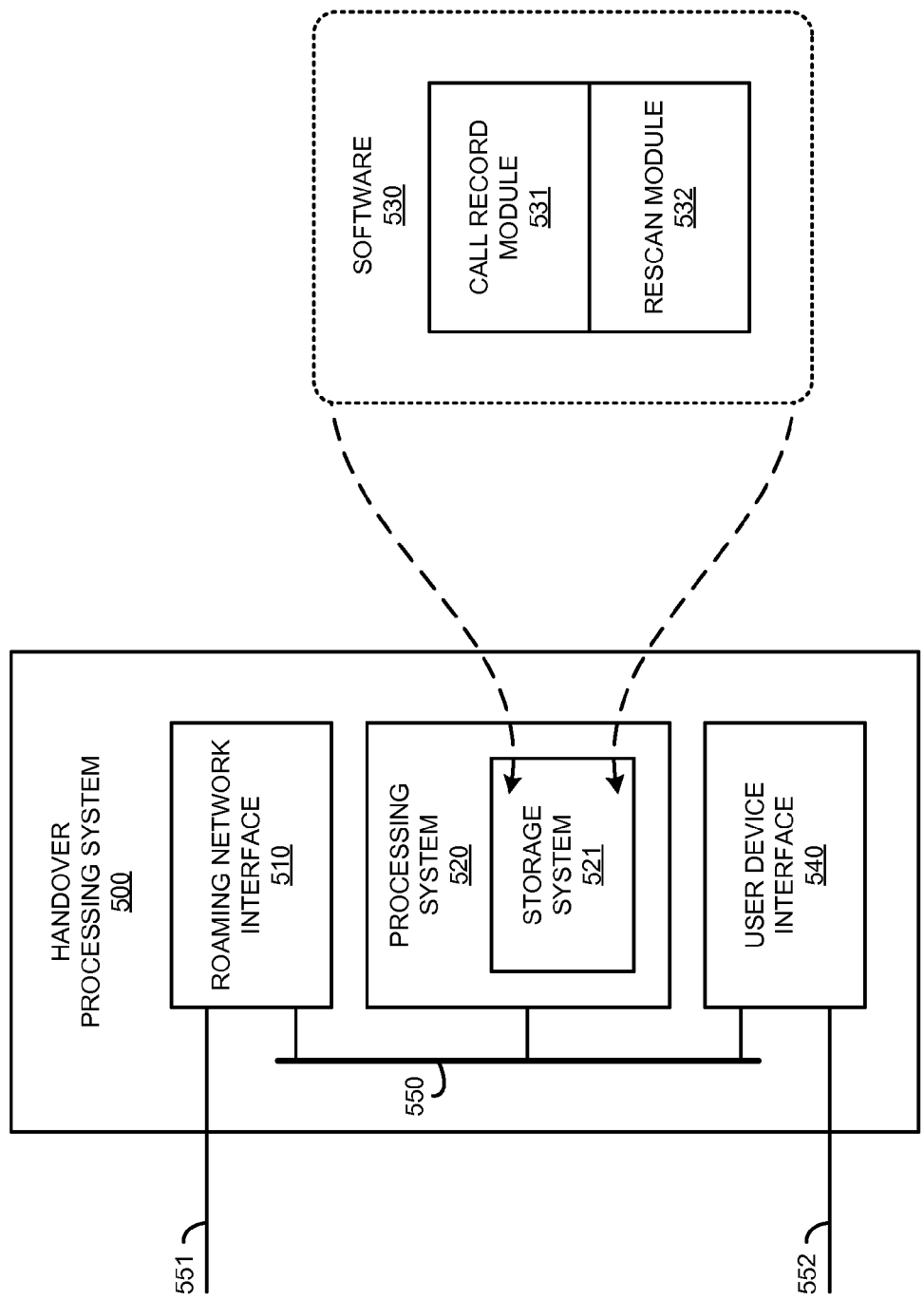
FIG. 5 is a block diagram illustrating a handover processing system.

FIG. 5 is a block diagram illustrating handover processing system 500, as an example of home wireless communication network 120 found in FIG. 1, or handover processing system 328 found in FIG. 3, although home wireless communication network 120 or handover processing system 328 could use other configurations. Handover processing system 500 includes roaming network interface 510, processing system 520, and user device interface 540. Roaming network interface 510, processing system 520, and user device interface 540 are shown to communicate over a common bus 550 for illustrative purposes. It should be understood that discrete links could be employed, such as network links. Handover processing system 500 may be distributed among multiple devices that together form elements 510, 520-521, 530-532, 540, and 550-552.

Roaming network interface 510 comprises network interface, router, and gateway equipment for communicating with wireless communication provider equipment, such as with a roaming wireless communication network, over the Internet, or other communication systems. Roaming network interface 510 exchanges communications over link 551. Link 551 could use various protocols or communication formats as described herein for links 152 or 352-353, including combinations, variations, or improvements thereof.

Processing system 520 includes storage system 521. Processing system 520 retrieves and executes software 530 from storage system 521. In some examples, processing system 520 is located within the same equipment in which roaming network interface 510 or user device interface 540 are located. In further examples, processing system 520 comprises specialized circuitry, and software 530 or storage system 521 could be included in the specialized circuitry to operate processing system 520 as described herein. Storage system 521 could include a computer-readable medium such as a disk, tape, integrated circuit, server, or some other memory device, and also may be distributed among multiple memory devices.

Software 530 may include an operating system, logs, utilities, drivers, networking software, and other software typically loaded onto a computer system. Software 530 could contain application programs, server software, firmware, or some other form of computer-readable processing instructions. When executed by processing system 520, software 530 directs processing system 520 to operate as described herein, such as request and receive roaming call records from roaming networks, process roaming call records and home call records, determine handover counts for wireless communication devices, and determine rescan rates for wireless communication devices, among other operations.

In this example, software 530 includes call record module 531 and rescan module 532. It should be understood that a different configuration could be employed, and individual modules of software 530 could be included in different equipment than handover processing system 500. Call record module 531 receives roaming call records transferred by a roaming wireless communication network, processes the roaming call records and home call records for at least one wireless communication device to determine a handover rate of the at least one wireless communication device. Rescan module 532 processes the handover rates of a wireless communication device or multiple wireless communication devices to determine a network rescan rate for the wireless communication devices. Rescan module 532 could also process network utilization information, wireless communication device status information, or other information to determine network rescan rates. Rescan module 532 transfers the network rescan rates for delivery to wireless communication devices.

User device interface 540 comprises communication interfaces for communicating with wireless communication devices, such as user devices. In some examples, user device interface 540 includes transceiver equipment and antenna elements for wirelessly exchanging communications with user devices, omitted for clarity, over the associated link 552. In other examples, user device interface 540 includes network interfaces, routers, or other communication equipment for transferring communications for delivery to user devices over other elements of handover processing system 500 or over the equipment and systems of a wireless communication network. User device interface 540 also receives command and control information and instructions from processing system 520 or roaming network interface 510 for transferring network rescan rates to for delivery to wireless communication devices and receiving status information transferred by wireless communication devices, among other operations. Link 552 could use various protocols or communication formats as described herein for links 150, 350, or 353, including combinations, variations, or improvements thereof.

Bus 550 comprises a physical, logical, or virtual communication link, capable of communicating data, control signals, and communications, along with other information. In some examples, bus 550 is encapsulated within the elements of roaming network interface 510, processing system 520, or user device interface 540, and may be a software or logical link. In other examples, bus 550 uses various communication media, such as air, space, metal, optical fiber, or some other signal propagation path, including combinations thereof. Bus 550 could be a direct link or might include various equipment, intermediate components, systems, and networks. Bus 550 could be a common link, shared link, or may be comprised of discrete, separate links.

Referring back to FIG. 1, wireless communication devices 110-111 each comprise transceiver circuitry and communication elements. The transceiver circuitry typically includes amplifiers, filters, modulators, and signal processing circuitry. Wireless communication devices 110-111 may also each include user interface systems, memory devices, computer-readable storage mediums, software, processing circuitry, or some other communication components. Wireless communication devices 110-111 may each be a user device, wireless communication device, subscriber equipment, customer equipment, access terminal, telephone, mobile wireless telephone, personal digital assistant (PDA), computer, e-book, mobile Internet appliance, wireless network interface card, media player, game console, or some other wireless communication apparatus, including combinations thereof. Although two user devices are shown in FIG. 1, it should be understood that a different number of user devices could be shown. Wireless communication devices 110-111 could each include multiple transceiver portions or antenna portions, among other circuit and equipment elements, for communicating wirelessly with multiple wireless communication networks, using different wireless communication modes or wireless communication protocols. For example, wireless communication devices 110-111 could each be a dual-mode phone capable of communicating with home wireless communication network 120 and roaming wireless communication network 130, or different elements thereof.

Home wireless communication network 120 comprises communication and control systems for providing access to communication services for user devices. In some examples, home wireless communication network 120 includes equipment to provide wireless access to communication services within different coverage areas to user devices, route communications between content providers and user devices, and receive registration and content requests, among other operations. Home wireless communication network 120 may also comprise base stations, base transceiver stations (BTS), base station controllers (BSC), mobile switching centers (MSC), home location registers (HLR), radio node controllers (RNC), call processing systems, authentication, authorization and accounting (AAA) equipment, access service network gateways (ASN-GW), packet data switching nodes (PDSN), home agents (HA), mobility access gateways (MAG), Internet access nodes, telephony service nodes, wireless data access points, routers, databases, or other communication and control equipment.

Roaming wireless communication network 130 comprises communication and control systems for providing access to communication services for user devices. In some examples, roaming wireless communication network 130 includes equipment to provide wireless access to communication services within different coverage areas to user devices, route communications between content providers and user devices, and receive registration and content requests, among other operations. Roaming wireless communication network 130 may also comprise base stations, base transceiver stations (BTS), base station controllers (BSC), mobile switching centers (MSC), home location registers (HLR), radio node controllers (RNC), call processing systems, authentication, authorization and accounting (AAA) equipment, access service network gateways (ASN-GW), packet data switching nodes (PDSN), home agents (HA), mobility access gateways (MAG), Internet access nodes, telephony service nodes, wireless data access points, routers, databases, or other communication and control equipment.

Communication link 152 uses metal, glass, optical, air, space, or some other material as the transport media. Communication link 152 could use various communication protocols, such as Time Division Multiplex (TDM), asynchronous transfer mode (ATM), Internet Protocol (IP), Ethernet, synchronous optical networking (SONET), circuit-switched, communication signaling, wireless communications, or some other communication format, including combinations, improvements, or variations thereof. Communication link 152 could be a direct link or may include intermediate networks, systems, or devices, and could include a logical network link transported over multiple physical links.

Wireless links 150-151 each use the air or space as the transport media. Wireless links 150-151 may each use various protocols, such as Code Division Multiple Access (CDMA), Evolution-Data Optimized (EV-DO), single-carrier radio transmission technology link (1xRTT), Worldwide Interoperability for Microwave Access (WiMAX), Global System for Mobile Communication (GSM), Universal Mobile Telecommunications System (UMTS), Long Term Evolution (LTE), Wireless Fidelity (Wi-Fi), High Speed Packet Access (HSPA), Radio Link Protocol (RLP), or some other wireless communication format, including combinations, improvements, or variations thereof. Although two main wireless links 150-151 are shown in FIG. 1, it should be understood that wireless links 150-151 are merely illustrative to show communication modes or wireless access pathway for user devices. In other examples, further wireless links could be shown, with portions of the further wireless links shared and used for different communication sessions and associated overhead communications.

Communication links 150-152 may each include many different signals sharing the same associated link, as represented by the associated lines in FIG. 1, comprising access channels, paging channels, notification channels, forward links, reverse links, user communications, communication sessions, overhead communications, frequencies, other channels, carriers, timeslots, spreading codes, transportation ports, logical transportation links, network sockets, packets, or communication directions.

FIGS. 1-5 and the previous descriptions depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a communication system, the method comprising:
   receiving roaming call records for wireless communication devices from a roaming wireless communication network;
   processing the roaming call records and home call records of a home wireless communication network for at least a first wireless communication device to determine a network handover count by at least determining a quantity of individual roaming call records occurring within a predetermined time of individual home call records for at least the first wireless communication device;
   processing the network handover count to determine a network rescan rate for the first wireless communication device; and
   transferring the network rescan rate for delivery to the first wireless communication device.

2. The method of claim 1, wherein the network handover count comprises a quantity of individual roaming call records which correspond to individual home call records for at least the first wireless communication device.

3. The method of claim 1, wherein the predetermined time comprises one minute.

4. The method of claim 1, wherein processing the roaming call records and the home call records to determine the network handover count further comprises determining network handovers between the roaming wireless communication network and the home wireless communication network for at least the first wireless communication device.

5. The method of claim 4, wherein determining the network handovers comprises determining if individual roaming call records occur within a predetermined time of individual home call records for at least the first wireless communication device.

6. The method of claim 1, wherein processing the network handover count to determine the network rescan rate for the first wireless communication device comprises increasing an initial network rescan rate when the network handover count exceeds a threshold count for network handovers between the roaming wireless communication network and the home wireless communication network.

7. The method of claim 1, wherein processing the network handover count to determine the network rescan rate for the first wireless communication device comprises decreasing an initial network rescan rate when the network handover count falls below a threshold count for network handovers between the roaming wireless communication network and the home wireless communication network.

8. The method of claim 1, further comprising:
receiving a battery level status of the first wireless communication device; and
processing the network handover count and the battery level status to determine the network rescan rate.

9. The method of claim 1, further comprising:
processing the roaming call records for a first set of the wireless communication devices associated with a first sector of the roaming communication network and processing the home call records for the first set associated with a second sector of the home wireless communication network to determine a sector network handover count for sector handovers of the first set between the first sector and the second sector;
processing the sector network handover count to determine a sector network rescan rate for the first set; and
transferring the sector network rescan rate for delivery to the first set within an overhead wireless communication portion of the home wireless communication network.

10. A communication system, comprising:
a network interface configured to receive roaming call records for wireless communication devices from a roaming wireless communication network;
a processing system configured to process the roaming call records and home call records of a home wireless communication network for at least a first wireless communication device to determine a quantity of individual roaming call records occurring within a predetermined time of individual home call records for at least the first wireless communication device to determine a network handover count;
the processing system configured to process the network handover count to determine a network rescan rate for the first wireless communication device; and
a wireless interface configured to transfer the network rescan rate for delivery to the first wireless communication device.

11. The communication system of claim 10, wherein the network handover count comprises a quantity of individual roaming call records which correspond to individual home call records for at least the first wireless communication device.

12. The communication system of claim 10, wherein the predetermined time comprises one minute.

13. The communication system of claim 10, wherein the processing system is configured to further determine network handovers between the roaming wireless communication network and the home wireless communication network for at least the first wireless communication device to determine the network handover count.

14. The communication system of claim 13, wherein the processing system is configured to determine if individual roaming call records occur within a predetermined time of individual home call records for at least the first wireless communication device to determine the network handovers.

15. The communication system of claim 10, comprising:
the processing system configured to increase an initial network rescan rate when the network handover count exceeds a threshold count for network handovers between the roaming wireless communication network and the home wireless communication network.

16. The communication system of claim 10, comprising:
the processing system configured to decrease an initial network rescan rate when the network handover count falls below a threshold count for network handovers between the roaming wireless communication network and the home wireless communication network.

17. The communication system of claim 10, comprising:
the wireless interface configured to receive a battery level status of the first wireless communication device; and
the processing system configured to process the network handover count and the battery level status to determine the network rescan rate.

18. The communication system of claim 10, comprising:
the processing system configured to process the roaming call records for a first set of the wireless communication devices associated with a first sector of the roaming communication network and process the home call records for the first set associated with a second sector of the home wireless communication network to determine a sector network handover count for sector handovers of the first set between the first sector and the second sector;
the processing system configured to process the sector network handover count to determine a sector network rescan rate for the first set; and
the wireless interface configured to transfer the sector network rescan rate for delivery to the first set within an overhead wireless communication portion of the home wireless communication network.

* * * * *